3,125,431
COMPLEX OF PHENYLUREAS AND CHLORO-
BENZOIC ACIDS AND USE AS HERBICIDES
Richard S. Kittila, Hockessin, Del., assignor to E. I. du
Pont de Nemours and Company, Wilmington, Del., a
corporation of Delaware
No Drawing. Filed Dec. 31, 1959, Ser. No. 863,121
4 Claims. (Cl. 71—2.6)

This invention relates to a class of chemical compositions. More particularly, it relates to crystalline complexes of aryl aliphatic substituted ureas and polychlorobenzoic aids.

In accordance with the present invention, it has been found that aryl aliphatic substituted ureas and certain polychlorobenzoic acids combine to form well-defined crystalline complexes, with the substituted urea and polychlorobenzoic acid being present in the complex in a 1:1 mole ratio.

The polychlorobenzoic acids that can be reacted with substituted ureas in accordance with the present invention are 2,3,6-trichlorobenzoic acid, 2,3,5-trichlorobenzoic acid, and 2,3,5,6-tetrachlorobenzoic acid.

The aryl aliphatic ureas that can be complexed with the above polychlorobenzoic acids, in accordance with the present invention, are those represented by the following formula

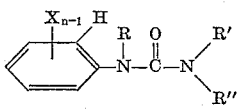

wherein X is selected from the group consisting of hydrogen, halogen and alkyl groups of 1 through 4 carbon atoms; $n$ is a whole positive integer of less than 5; R is selected from the group consisting of hydrogen and methyl; R' is selected from the group consisting of methyl and ethyl; and R" is an alkyl group of 1 through 4 carbon atoms or hydrogen.

As aforementioned, the above-described polychlorobenzoic acids and substituted ureas can be combined to form well-defined crystalline complexes. This is accomplished by admixing the polychlorobenzoic acid with the substituted urea in an appropriate liquid medium, preferably a medium such as xylene or toluene that is a solvent for the two reactants. Ordinarily it is desirable to use a slight excess of the acid component, and in some instances heating the mixture may be desirable to accelerate the complex formation. The resultant complex usually separates from the solvent; in any event it can be isolated by pouring the mixture into a large volume of an inert organic liquid that is not a solvent for the complex, such as ligroin, petroleum ether, pentane, kerosene, hexane, and heptane.

It has been found that by this mechanism of substituted urea-polychlorobenzoic acid complex formation, one can separate relatively high-purity polychlorobenzoic acid isomers from a mixture of isomers. Thus, in the manufacture of herbicidally active polychlorobenzoic acids, a mixture of isomers is ordinarily obtained. This mixture contains not only relatively high proportions of the herbicidally active isomers but also significant amounts of other inactive isomers. By combining this mixture of polychlorobenzoic acid isomers with a substitude urea of the above-described type, in a suitable solvent as described above, there is obtained a 1:1 complex comprising essentially pure active isomers as the acid portion, as will be described in greater detail in the examples that follow.

The chemical complexes of the present invention are highly stable in the absence of water, and therefore are well-adapted for providing 1:1 mixtures of the herbicidally active polychlorobenzoic acids and herbicidally active substituted ureas. When complexed in this fashion, there is avoided the tendency of crystalline segregation which poses a serious problem when shipping mere physical mixtures of the individual components. These complexes can be used to prepare excellent herbicidal compositions by dissolving the complex in an appropriate solvent of the above-described type, and then spraying the solution onto a conventional powdered solid herbicidal carrier such as fuller's earth or Attaclay. After the solvent has evaporated, there is obtained an extremely effective powdered solid herbicidal composition. This composition can be used in the form of a dust, or alternatively, it can be extended with water to form an aqueous spray. If the powdered composition is to be used to form an aqueous spray, it is desirable to include a wetting agent in the powdered composition. In an aqueous spray of course the complex dissociates into the substituted urea and polychlorobenzoic acid.

All of the chemical complexes of the present invention are extremely effective herbicides, combining the well-known herbicidal properties of the polychlorobenzoic acid and the substituted urea components. Upon application to soil or to plant foliage, the complex is broken down by moisture to produce an intimate mixture of the two herbicidally active components of the complex. This hydrolysis occurs quite rapidly, and therefore effective herbicidal action quickly begins.

The above-described complex-forming mechanism can also be utilized as a means for isolating in high yield both the substituted urea and the acid from their solutions or suspensions in inert solvents as may occur in their manufacture.

In order that the present invention can be more fully understood, the following examples are given:

*Example 1*

A mixture of 5.9 grams (0.03 M) of 3-(p-chlorophenyl)-1,1-dimethylurea and 8.5 grams (0.035 M) of 2,3,6-trichlorobenzoic acid in 70 ml. of xylene is stirred overnight. The solid is collected and is found to be 2,3,6-trichlorobenzoic acid complexed with the p-chlorophenyl dimethylurea. Wt. 6.5 grams (51% yield), M.P. 93–94° C. Additional material is obtained by pouring the xylene solution into a large volume of petroleum ether. Wt. 5.6 grams, M.P. 93–94° C. (total yield, 95%). The ratio of acid to urea in both fractions is found to be 1:1 by slurrying the complex in methanol-water and titrating the free acid with sodium hydroxide.

*Example 2*

A mixture of 1.1 grams (0.005 M) of 3-(3,4-dichlorophenyl)-1,1-dimethylurea and 1.3 grams (0.006 M) of 2,3,6-trichlorobenzoic acid in 12 ml. of xylene is stirred for two hours. The solid is collected and is found to be a complex of 2,3,6-trichlorobenzoic acid with the substituted urea. Wt. 2.1 grams (95% yield), M.P. 118–119° C. The ratio of acid to urea is found to be 1:1 by titration with base.

*Example 3*

A mixture of 16.4 grams (0.1 M) of 3-phenyl-1,1-dimethylurea and 28.2 (0.125 M) of 2,3,6-trichlorobenzoic acid in 200 ml. of xylene is stirred for two hours. The solid is collected and is found to be a complex of 2,3,6-trichlorobenzoic acid with the substituted urea in a 1:1 mole ratio.

*Example 4*

A mixture of 2.2 parts of 3-(3,4-dichlorophenyl)-1,1-dimethylurea and 2.6 parts of 2,3,5-trichlorobenzoic acid are mixed together in 20 parts of xylene with stirring for eight hours. The resultant slurry is drowned in 100 parts of petroleum ether. A solid is obtained which is collected and dried on the filter. Analysis shows the solid to be a 1:1 molar complex of 2,3,5-trichlorobenzoic acid with the substituted urea.

Example 5

A mixture of 2.2 parts of 3-(3,4-dichlorophenyl)-1,1-dimethylurea and 3.1 parts of 2,3,5,6-tetrachlorobenzoic aicd in 20 parts of xylene are stirred for 10 hours. The slurry is drowned in 100 parts of petroleum ether and the solid is collected and dried on a filter. Analysis shows the product to be a 1:1 mole ratio complex of the polychlorobenzoic acid with the substituted urea.

Examples 6 to 24

The following 1:1 complexes are prepared by contacting 0.010 M of the urea with 0.012 M of the acid in 20 ml. of xylene for 10 hours and pouring the mixture into 100 ml. of petroleum ether. The solid is collected and dried on a filter.

| Example | Substituted Urea | Polychlorobenzoic Acid |
|---|---|---|
| 6 | 3-phenyl-1-methyl-1-n-butylurea. | 2,3,5,6-tetrachlorobenzoic acid. |
| 7 | 3-p-chlorophenyl-1,1,3-trimethylurea. | 2,3,6-trichlorobenzoic acid. |
| 8 | 3-(3,4-dichlorophenyl)-1-methyl-1-n-butylurea. | Do. |
| 9 | ___do___ | 2,3,5,6-tetrachlorobenzoic acid. |
| 10 | 3-(3-methylphenyl)-1,1-dimethylurea. | 2,3,6-trichlorobenzoic acid. |
| 11 | ___do___ | 2,3,5-trichlorobenzoic acid. |
| 12 | 3-(4-isopropylphenyl)-1,1-dimethylurea. | 2,3,6-trichlorobenzoic acid. |
| 13 | ___do___ | 2,3,5-trichlorobenzoic acid. |
| 14 | 3-phenyl-1,1-dimethylurea | Do. |
| 15 | ___do___ | 2,3,5,6-tetrachlorobenzoic acid. |
| 16 | 3-p-chlorophenyl-1-methyl-1-ethylurea. | 2,3,5-trichlorobenzoic acid. |
| 17 | ___do___ | 2,3,5,6-tetrachlorobenzoic acid. |
| 18 | 3-(3,4-dichlorophenyl)-1-methylurea. | 2,3,6-trichlorobenzoic acid. |
| 19 | 3-(3,4-dichlorophenyl)-1-methyl-1-n-butylurea. | 2,3,5-trichlorobenzoic acid. |
| 20 | 3-(3,4-dichlorophenyl)-1-methyl-1-n-propylurea. | 2,3,5,6-tetrachlorobenzoic acid. |
| 21 | 3-phenyl-1-methyl-1-isopropylurea. | 2,3,6-trichlorobenzoic acid. |
| 22 | 3-phenyl-1-ethyl-1-isopropylurea. | 2,3,5,6-tetrachlorobenzoic acid. |
| 23 | 1-(3,4-dichlorophenyl)-1,3-dimethylurea. | 2,3,6-trichlorobenzoic acid. |
| 24 | 3-(2,4,5-trichlorophenyl)-1,1-dimethylurea. | Do. |

Example 25

A mixture of 2.2 grams of 3-(3,4-dichlorophenyl)-1,1-dimethylurea and 2.6 grams of crude mixture of polychlorinated benzoic acids (containing approximately 70% of 2,3,6-trichlorobenzoic acid and the remaining 30% being predominantly 2,3,4- and 2,4,5-trichlorobenzoic acid) in 25 ml. of xylene is stirred for thirty minutes. An insoluble solid precipitates. The precipitate weighs 2.7 grams, and has a melting point of 113–116° C. Yield, 61%. Analysis of the product indicates that the product is a 1:1 complex of trichlorobenzoic acid with the substituted urea. Ninety-three percent of the polychlorinated benzoic acids in the complex consists of 2,3,6-trichlorobenzoic acid.

Example 26

2.2 grams of 3-(3,4-dichlorophenyl)-1,1-dimethylurea and 2.8 grams of crude polychlorobenzoic acid mixture (containing approximately 75% of 2,3,5,6-tetrachlorobenzoic acid) are added to 25 ml. of xylene at room temperature and stirred for thirty minutes. An insoluble solid is obtained, which analysis shows to be a 1:1 molar complex of the substituted urea with polychlorobenzoic acid, the polychlorobenzoic acid component of the complex consisting essentially of 2,3,5,6-tetrachlorobenzoic acid.

Example 27

2.2 grams of 3-(3,4-dichlorophenyl)-1-methyl-1-n-butylurea and 2.5 grams of a crude polychlorobenzoic acid mixture (containing approximately 60% of 2,3,5-trichlorobenzoic acid and the remainder being predominantly 2,3,4- and 2,4,5-trichlorobenzoic acid) are mixed together in 25 ml. of xylene at room temperature and stirred for thirty minutes. The insoluble solid is collected and is found to contain essentially only 2,3,5-trichlorobenzoic acid complexed with the substituted urea in a 1:1 mole ratio.

This application is a continuation-in-part of my copending application Serial No. 733,214, filed May 5, 1958, now abandoned.

I claim:

1. A 1:1 mole ratio chemical complex of a polychlorobenzoic acid selected from the group consisting of 2,3,6-trichlorobenzoic acid, 2,3,5-trichlorobenzoic acid, and 2,3,5,6-tetrachlorobenzoic acid with a substituted urea represented by the formula

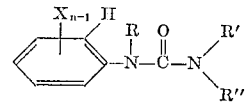

wherein X is selected from the group consisting of hydrogen, halogen and alkyl groups of 1 through 4 carbon atoms; $n$ is a whole positive integer of less than 5; R is selected from the group consisting of hydrogen and methyl; R' is selected from the group consisting of methyl and ethyl; and R" is selected from the group consisting of hydrogen and alkyl groups of 1 through 4 carbon atoms.

2. The method of preparing a complex of claim 1 which consists essentially of contacting the substituted urea and the polychlorobenzoic acid in a liquid medium that is a solvent for said substituted urea and polychlorobenzoic acid, whereby said complex forms in the reaction medium.

3. The method of controlling the growth of undesired vegetation comprising applying thereto, in an amount sufficient to control said growth, a herbicidally effective amount of a complex of claim 1.

4. A 1:1 mole ratio chemical complex of a polychlorobenzoic acid selected from the group consisting of 2,3,5-trichlorobenzoic acid and 2,3,5,6-tetrachlorobenzoic acid with 3-p-chlorophenyl-1,1-dimethyl urea.

References Cited in the file of this patent

UNITED STATES PATENTS

| | | |
|---|---|---|
| 2,702,289 | Bowman et al. | Feb. 15, 1955 |
| 2,709,648 | Ryker et al. | May 31, 1955 |
| 2,759,919 | Gorin | Feb. 26, 1956 |
| 2,782,112 | Gilbert et al. | Feb. 19, 1957 |
| 2,801,911 | Gilbert et al. | Aug. 6, 1957 |